May 15, 1945. E. P. ELSTON 2,376,315
DEVICE FOR THE CONSTRUCTION OR DETERMINATION OF ANGLES
Filed April 2, 1943 2 Sheets-Sheet 1
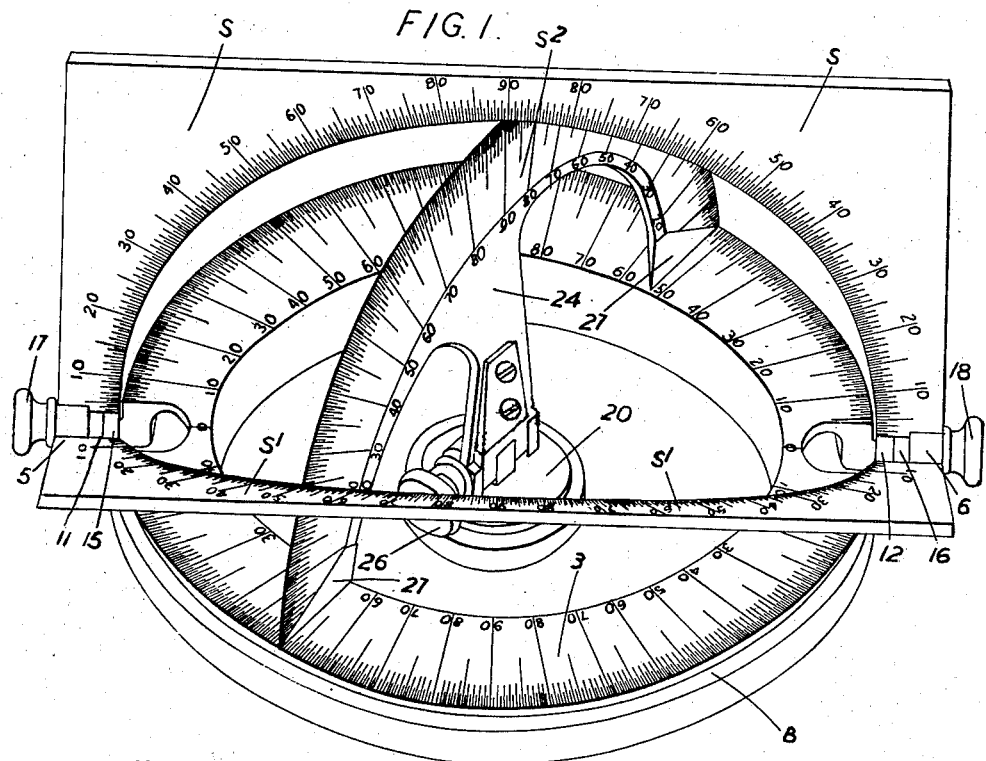
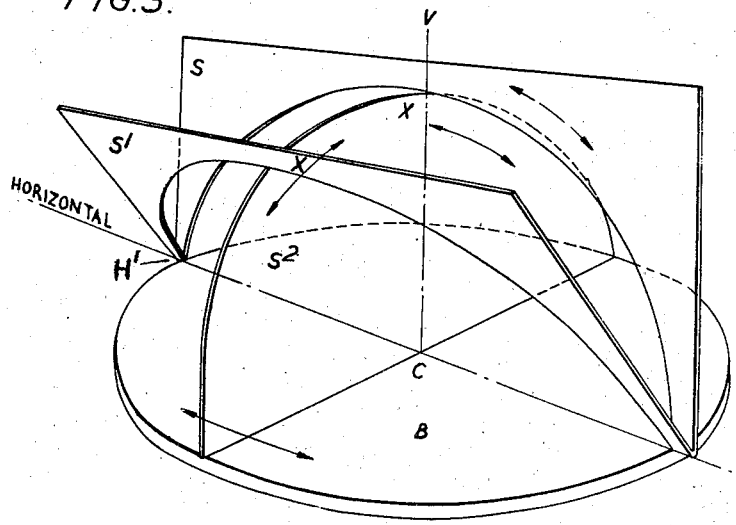
Inventor
EDWARD P. ELSTON.
By Norman S. Barlow
Attorney May 15, 1945.  E. P. ELSTON  2,376,315
DEVICE FOR THE CONSTRUCTION OR DETERMINATION OF ANGLES
Filed April 2, 1943   2 Sheets-Sheet 2

Inventor
EDWARD P. ELSTON.

By
Norman S. Barlow
Attorney

Patented May 15, 1945

2,376,315

UNITED STATES PATENT OFFICE 2,376,315

DEVICE FOR THE CONSTRUCTION OR DETERMINATION OF ANGLES

Edward Percy Elston, Nottingham, England, assignor of three-fourths to Herbert Richard Shaw, Shirley, England Application April 2, 1943, Serial No. 481,559½
In Great Britain March 3, 1942

1 Claim. (Cl. 33—1)

This invention has reference to a new or improved device for the construction or determination of angles, and relates particularly to that type of instrument which is or may be employed in geometry for the calculation or determination of angles between any two intersecting planes, or may be utilised for range finding or navigation. The particular object of the present invention is to provide an instrument of this kind which is simple in design and operation and which has the requisite precision of setting, and is compact when out of use.

Referring to the drawings:

Figure 1 is a perspective view of a device according to this invention.

Figure 3 is a diagrammatic view of the device as shown in Figure 1, whilst,

Figure 2:
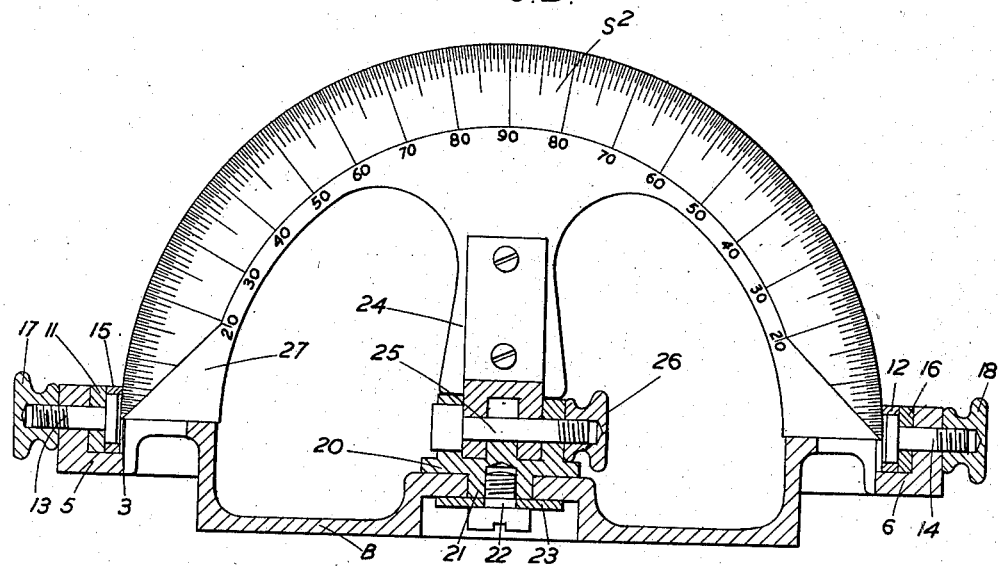
Figure 2 is a section through the diametrically oppositely disposed lugs on the base.

In carrying the present invention into practice as shown upon the accompanying drawings, the device consists essentially of a dished base B having formed on the upper surface 3 of same a graduated scale divided into degrees from 0° to 90° in each of the four quarters.

Pivotally mounted in the diametrically oppositely disposed lugs 5, 6 of the base B are two plane members S, $S^1$ which are graduated in degrees from 0° to 90° in each of the two halves of said members.

These plane members S, $S^1$ are pivotally mounted and are adapted to be locked in a set position. The plane member S is provided with lugs 11, 12. The lug 11 is provided with a bearing which is mounted on the shank of the locking pin 13, whilst the lug 12 is bored to accommodate and be mounted on the head of the locking pin 14. The plane member $S^1$ is also provided with lugs 15, 16. The lug 15 is bored to accommodate and be mounted on the head of the locking pin 13, whilst the lug 16 is bored and mounted on the shank of the locking pin 14. The locking pins 13, 14 are provided with locking nuts 17, 18.

It will be noted that in the beforedescribed arrangement of mounting for the plane members S, $S^1$ that each locking nut 17, 18 controls the locking of a separate plane member.

The radius on the inner edge of the plane members S, $S^1$ is equal to that of the outer peripheral edge of the surface 3 of the base B.

By the arrangement of the plane members S, $S^1$ as heretofore described, they are pivotally mounted upon the horizontal centre line of the base B, so that they may be displaced relatively one to the other.

A segment $S^2$ is provided which is graduated in degrees from 0° to 90° in the two halves of same. This segment $S^2$ is mounted on a universal joint on the centre of the base B.

A rotary mounting 20 is provided which has formed thereon a lug 21, which lug 21 is rotatably mounted in the centre of the base B and is secured in position in the base B by the screwed pin 22 and washer 23.

The segment $S^2$ is provided with an arm 24 which is pivotally mounted in the rotary mounting 20. The end of the arm 24 is pivotally mounted on the locking pin 25 which has a locking nut 26, for locking the segment $S^2$ in the required position.

The ends 27 of the segment $S^2$ are chamfered to a feather edge, to register against the graduations on the surface 3 of the base member B.

It will be seen that if each of the plane members S, $S^1$ which pivot upon the pins 13, 14 are moved on their pivots relative one to the other and the segment $S^2$ is rotated on the pin 25 relative to the base B, the angle between the plane members S and $S^1$ may be read upon the graduated segment $S^2$ at any given angle between the horizontal and the vertical to which the segment $S^2$ may be displaced. Furthermore, by rotating the segment $S^2$ horizontally, any oblique angle may be obtained between the plane members S and $S^1$.

It will also be seen that if the segment $S^2$ be set vertically at right-angles to the circular base B and rotated horizontally until it intersects the base B at right-angles to the horizontal axis upon which plane members S, $S^1$ intersect, then the plane members S, $S^1$ may be displaced at any desired angle relative to the base B, the said desired angle being read upon the segment $S^2$ at the point of intersection with the plane members S, $S^1$. Furthermore, if either of the plane members S, $S^1$ be set vertically at right-angles to the base B, and the segment $S^2$ set at right-angles to the axis of the plane members, S, $S^1$, the segment $S^2$ may be set at any desired angle between the horizontal and the vertical relative to the base B, such desired angle being read at the point of intersection upon the plane members S or $S^1$, whichever has been set vertically at right-angles to the base B.

Inversely it will be seen that if segment $S^2$ be set at any angle of inclination relative to the base B, the angle at which the segment $S^2$ is set may be ascertained by rotating the segment $S^2$ horizontally until its diameter is at right-angles to the horizontal axis of the plane members S and $S^1$, and setting either plane members S or $S^1$ to the point of intersection with the segment $S^2$. Also if the plane members S or $S^1$ be set at any angle relative to the base B, such angle may be found by setting segment $S^2$ at right-angles to the horizontal axis of the plane members S and $S^1$ and vertically at right-angles to the base B and reading the angle of the plane members S and $S^1$ at the point where it intersects segment $S^2$.

It will be understood that the term horizontal and vertical are used for distinguishing purposes only and do not carry implication concerning the disposition of the device in space.

It is obvious that what has been called the horizontal axis need not in fact lie in the plane of the horizon.

Figure 4:
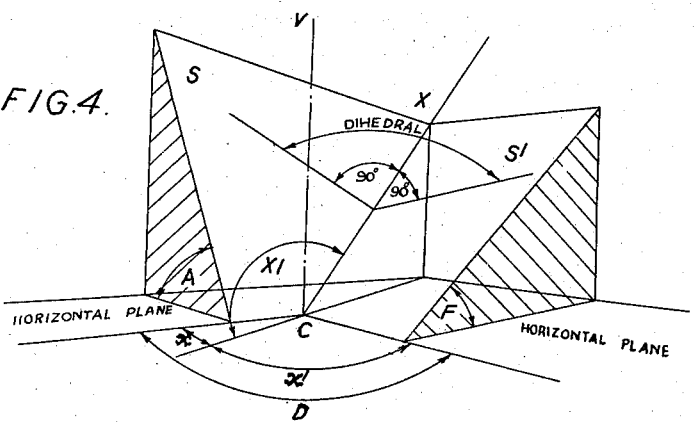
Figure 4 is a diagram showing one application of the use of this invention, in this case to the finding of the di-hedral.

Referring to Figures 3 and 4 of the drawings, if read together, they show diagrammatically one application of the device according to this invention, as applied to the solving of the di-hedral. The reference letters as applied to the base, plane members and segments shown in Figures 1 and 2 correspond with the diagrammatic representation of these parts shown in Figure 3, in order that the diagrams may be read in conjunction with Figures 1 and 2.

An incline plane S intersects a horizontal plane at a known angle A. Incline plane S and the horizontal plane are both intersected by a plane $S^1$ inclined at a known angle F. The angle D is also known and may be from 0° to 180°. The di-hedral is the angle at 90° to C—X which is the line of intersection of S—$S^1$.

The di-hedral is solved in two stages:

First stage: Find angles XI, $x$ and $x^1$.

Set plane S to angle A and plane $S^2$ to angle F and rotate to angle D from $H^1$ Figure 3.

Read point of intersection on plane S as shown in Figure 3, where it intersects $S^2$.

Reset $S^2$ to the vertical and rotate to intersect X on S.

The angle XI is read on $S^2$ from B to X.

$x$ is read on B from $H^1$ to $S^2$.

$x^1$ is read on B and will be the angle D minus $x$.

Second stage: using angles XI, $x$ and $x^1$.

Set $S^2$ to XI.

Set S to angle $x$, read on $S^2$ from centre.

Set $S^1$ to angle $x^1$ read on $S^2$ from centre.

It will now be seen that the horizontal axis is the valley C—X in the diagram, Figure 4 and that $S^2$ is the horizontal plane intersected by the planes S and $S^1$.

To find the di-hedral, reset $S^2$ to the vertical and read the angle on same.

In angle finders and other instruments having the purpose of ascertaining direction or location as between intersecting planes it is known to employ a graduated circular base having fixed and rotatable sections and having graduated hinged or hinged and rotatable segments mounted thereon; the present invention is distinguished from such prior art by the simplification and precise means of pivotably and rotatably mounting the segments relative to the base, and in the specific arrangement and interassociation of the graduated members constituting the complete instrument as hereinbefore described.

I claim:

An instrument for the determination of angles, comprising in combination, a base member, a graduated circular scale embodying 360° mounted on the base member, a member pivotally mounted in the centre of the circular scale capable of rotation on the axis of said circular scale, a pivotal joint in the member pivotally mounted in the base, the axis of said joint being at right-angles to the axis of the pivot in the base member, a semi-circular graduated segment embodying 180° mounted on the pivot at right-angles to the axis of the base, locking means on the pivot on which the graduated segment is mounted for locking said segment in the desired position, a pair of independently movable graduated plane members embodying 180° mounted on oppositely disposed pivots positioned on the base member which are adapted to register against the peripheral edge of the semi-circular graduated segment, and locking means for locking said independently movable graduated plane members in the required position.

EDWARD PERCY ELSTON.